April 23, 1957 H. C. HUNTER 2,789,564
TOBACCO LEAF DEVEINING MACHINE
Filed Jan. 27, 1955 3 Sheets-Sheet 1
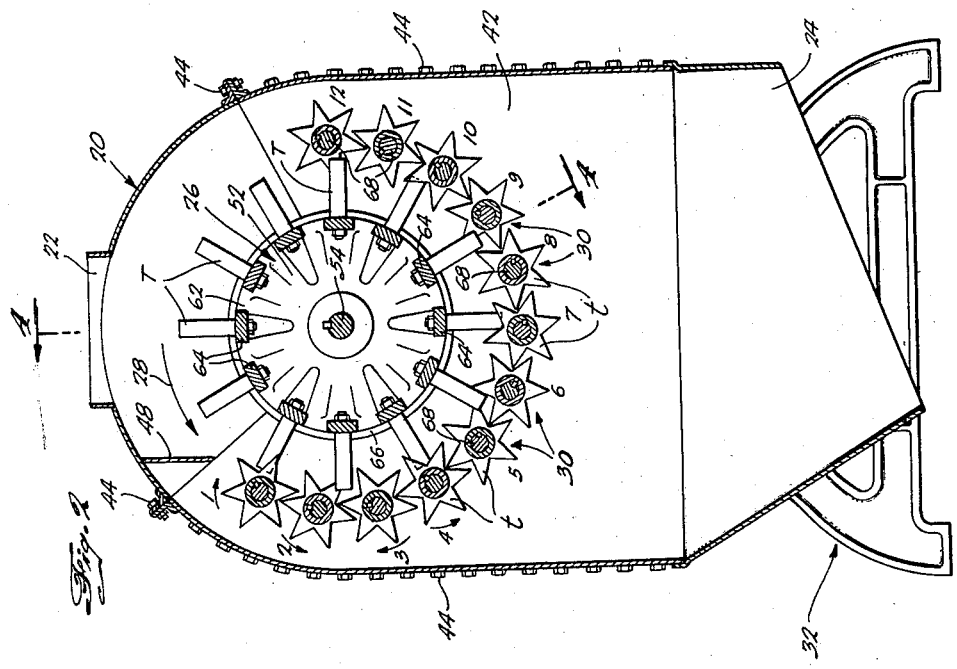
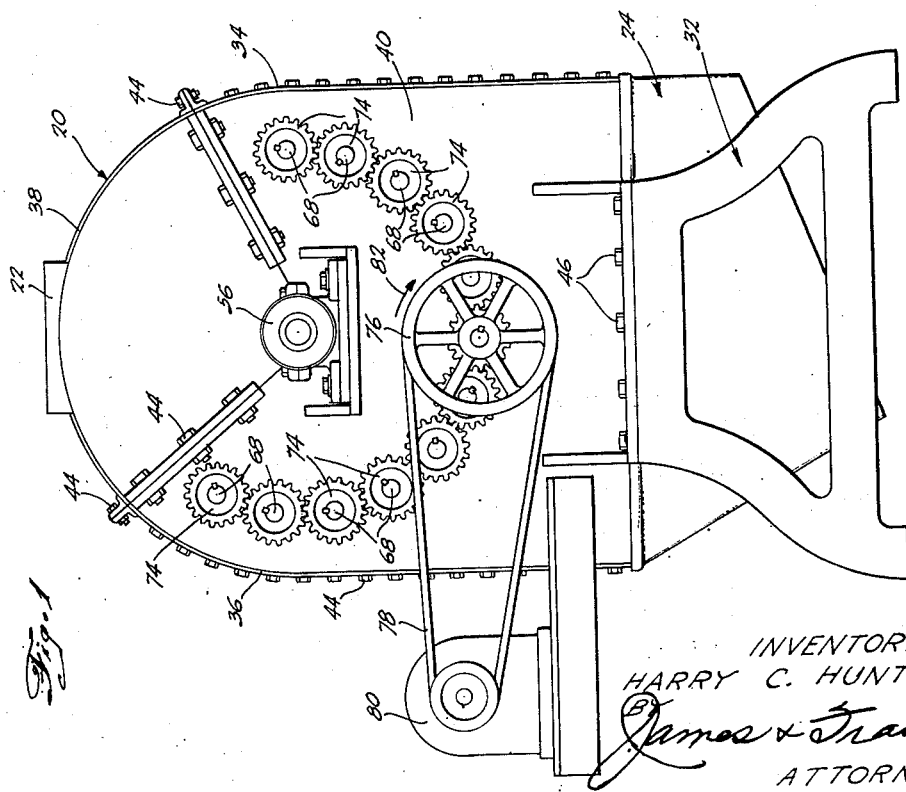
INVENTOR.
HARRY C. HUNTER
BY James & Franklin
ATTORNEYS.

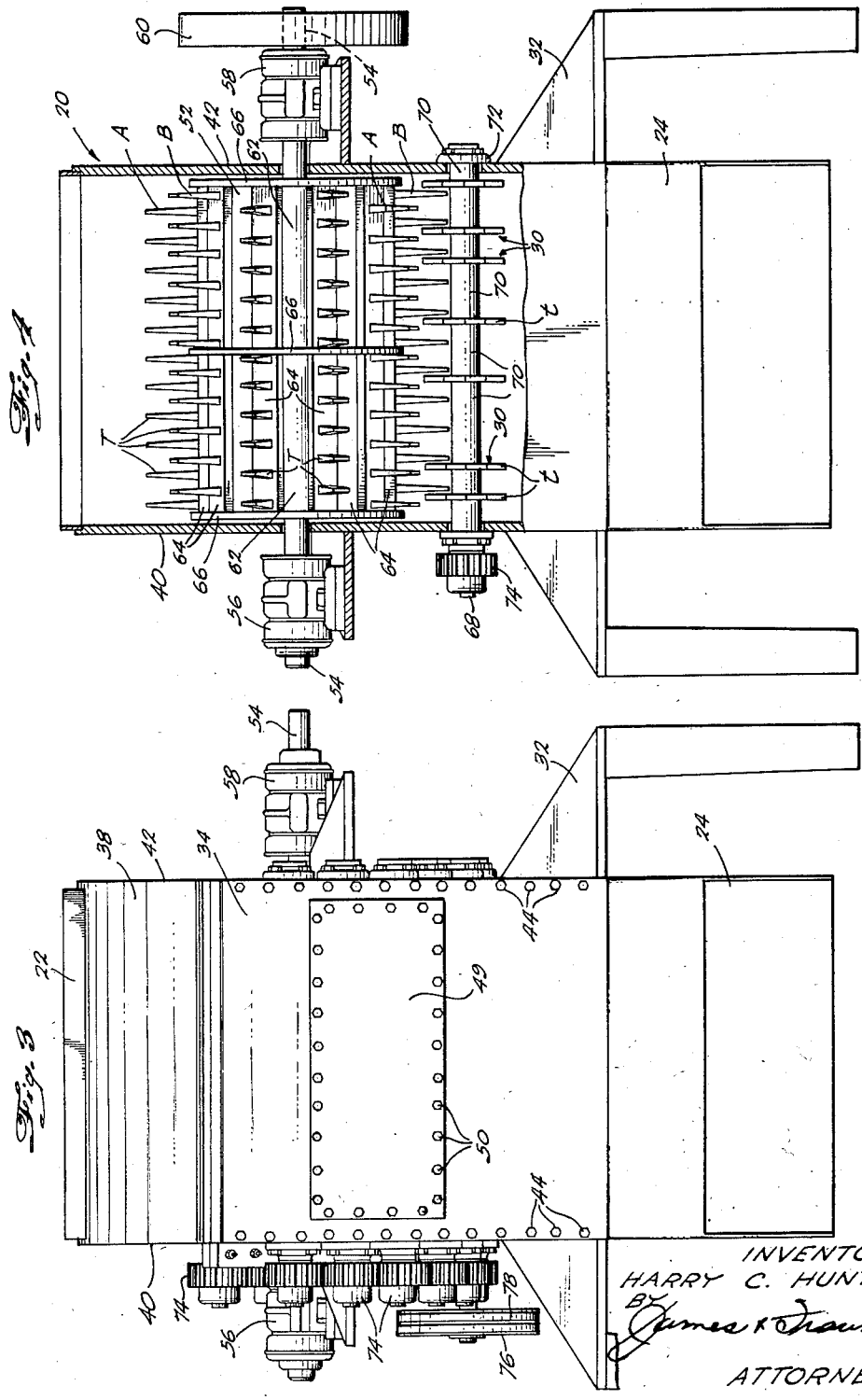

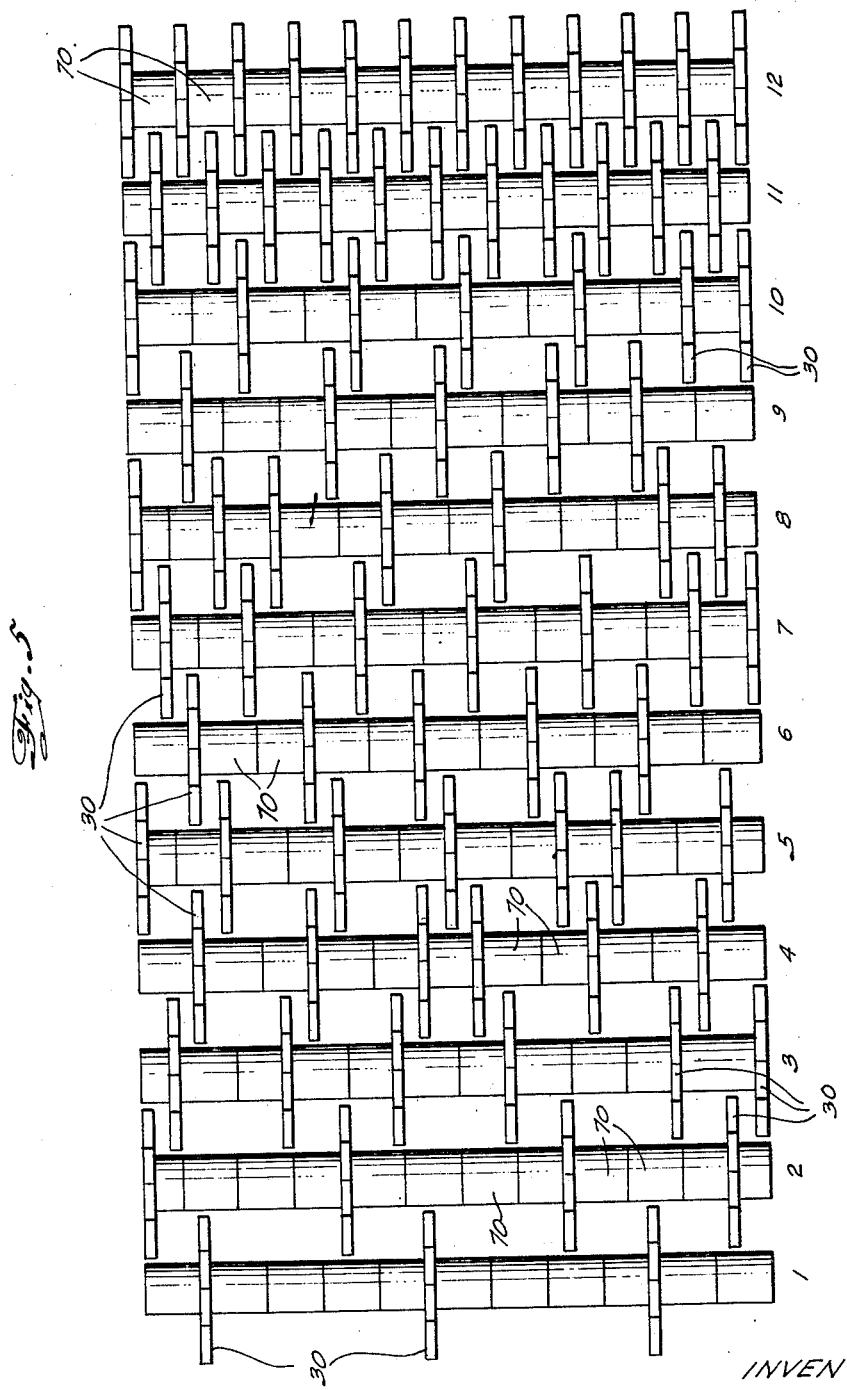

United States Patent Office 2,789,564
Patented Apr. 23, 1957

2,789,564

TOBACCO LEAF DEVEINING MACHINE

Harry C. Hunter, Petersburg, Va., assignor to Brown & Williamson Tobacco Corporation, Louisville, Ky., a corporation of Delaware Application January 27, 1955, Serial No. 484,339

14 Claims. (Cl. 131—145)

This invention relates to a tobacco leaf deveining machine.

In known types of tobacco leaf deveining or threshing machines, the leaf lamina is separated from the leaf stems and veins by the action of a toothed rotor beating against stationary teeth, or by the action of a toothed rotor beating against a perforated cage or basket, or by the action of a toothed rotor beating first against stationary teeth and then against a perforated cage or basket. In operation, the leaf is dropped onto the rotor, and the teeth of the rotor convey and drive the leaf through a set of stationary teeth causing the breaking up of the leaf, and/or the leaf may be struck by the rotor teeth against the perforated edges of the basket, the leaf falling through the cage perforations to be discharged. Known types of tobacco leaf deveining or threshing machines employ a toothed rotor either in combination with stationary teeth or in combination with a perforated cage or basket or in combination with both stationary teeth and a perforated cage or basket. In this type of thresher, however, when the leaf is struck against stationary objects such as the stationary teeth and/or basket perforation edges, some of the leaf always hangs on the fixed teeth and/or perforations, and while hanging the leaf receives an undesired pulverizing action.

The prime object of the present invention centers about the provision of a tobacco deveining machine or thresher constructed and designed to prevent the undesired pulverizing of the leaf in the deveining process and to thereby obtain an improved finished lamina product.

In carrying out the prime object, the deveining machine is constructed so that in the deveining process the leaf is acted upon by a toothed rotor moving in relation to a series of moving toothed members, the moving toothed members being also preferably so arranged as to themselves form the discharge cage or basket of the machine. By means of this construction, the following functions and results are achieved:

(1) The moving toothed members behave as self-cleaning teeth, eliminating the breaking of the leaf into fine particles;

(2) The machine thus constructed is capable of lower rotational speeds for the toothed rotor, this being a factor in imparting a less pulverizing action to the leaf;

(3) The machine permits the introduction of leaf at a higher moisture content, resulting in an improved product; and (4) The action of the rotor teeth against the moving toothed members arranged in cage or basket form, results in a combing and smoothly shearing action to remove the leaf from the vein rather than the cutting or breaking action incident to prior type threshers.

To the accomplishment of the foregoing objects and to such other objects as may hereinafter appear, the invention relates to the tobacco leaf deveining machine as sought to be defined in the appended claims taken together with the following specification and illustrated in the accompanying drawings, in which:

Fig. 1 is a side elevational view of the deveining machine;

Fig. 2 is a vertical section thereof;

Fig. 3 is an end elevational view of the machine;

Fig. 4 is a view similar to Fig. 3 with part of the casing removed to show the interior construction thereof, and taken in cross-section in the planes of the broken line 4—4 of Fig. 2, and with other parts (some of the toothed members) removed for purposes of clarity; and Fig. 5 is a view showing in development the arrangement of the toothed members.

Referring now more in detail to the drawings, and having reference first to Fig. 2 thereof, the tobacco leaf deveining machine comprises in its generic conception a casing or housing generally designated as 20, having a leaf entrant or charging opening 22 and an exit chute or discharging opening 24, which houses a toothed rotor generally designated as 26 arranged to receive tobacco leaves from the charging opening 22 and rotatable in the direction of the arrow 28 to convey the leaves to be deveined, a plurality of movable and preferably rotatable toothed members generally designated as 30 spaced at and partially about the periphery of the toothed rotor 26, the teeth of the rotor and the teeth of said members being spaced to intermesh to act upon the said conveyed leaves to devein the same, the said toothed rotor 26 being revolved and the said toothed members 30 being moved (rotated) whereby the teeth of the rotor and the teeth of said members are both moved, with the one moved relatively to the other, in the deveining and leaf discharging process. The toothed members 30, as depicted in Fig. 2, are disposed between the rotor 26 and the chute or discharging opening 24 in basket form, and preferably define the cage of the machine through which the deveined laminae and veins are discharged.

The housing 20 is set on a supporting stand 32 which latter may be mounted on support legs (not shown) to elevate the machine for allowing a conveyor to pass beneath the chute 24, the conveyor functioning to carry away the discharged material for further processing.

The casing or housing 20 may comprise a plurality of wall sections secured together, such as the end walls 34 and 36, the top wall 38 and the side walls 40 and 42, suitably bolted together by the groups of bolts indicated as 44, the housing being, in turn, secured to the supporting stand 32 by the bolts 46. The casing is also provided interiorly with a baffle plate 48 positioned as indicated in Fig. 2 of the drawings. The casing end wall 34 is also preferably provided with a removable clean-out door 49 normally attached by the bolts 50.

The toothed rotor 26 comprises a rotor drum 52 keyed to a shaft 54 rotatable in externally mounted bearings 56 and 58, the shaft being driven by a pulley 60 keyed thereto, the rotor drum 52 being provided with radially extending teeth disposed both axially and circumferentially on the rotor. More specifically the rotor drum comprises one or more hub sections 62 mounted on the shaft 54 slotted around its circumference to receive tooth bars 64, 64 (here shown as twelve in number), held in place by three retainer rings 66, 66 (see particularly Fig. 4), open spaces being left between the tooth bars 64, 64; and to each tooth bar are fixed a plurality of axially spaced teeth T, the said teeth being uniformly spaced parallel to the shaft axis. In assembling the tooth bars 64, 64, adjacent bars are reversed end-to-end, so that the teeth T of one bar are staggered with reference to the teeth of the adjacent bar, as clearly shown in Fig. 4 of the drawings; and for convenience the staggered sets of bar teeth are designated as the "A" sets and the "B" sets (see Fig. 4). In the commercial structure which is exemplified in the drawings eleven teeth are mounted on each tooth bar, of uniform tooth spacing of 2⅝". In the exemplified structure there are six rows or bars of A teeth and six rows or bars of B teeth in alternating staggered relation.

The movable toothed members 30, 30 cooperating with the toothed rotor and arranged preferably to define a basket or cage around the rotor, as indicated above, comprise a plurality of movable, i. e., rotatable, toothed members axially and circumferentially arranged about the periphery of the drum rotor 52, as best depicted in Figs. 2 and 4 of the drawings, the arrangement being such that the teeth T, T of the rotor and the teeth of said members 30, 30 intermesh in the operation of the machine to act upon the leaves to devein the same, the said toothed members 30, 30 further functioning as the leaf discharge basket for the machine. To this end the toothed members 30 comprise a group of circumferentially arranged sets of toothed members, twelve of such sets being illustrated in the drawings and numbered from one to twelve, each set consisting of axially spaced toothed elements t, t, each such set being keyed to a rotatable shaft 68, the toothed elements being spaced on said shaft by means of spacer sleeves 70 (of different lengths). Preferably the toothed elements t, t comprise star wheels, as best shown in Fig. 2 of the drawings, the converging portions of the star defining the teeth of the element.

The shafts 68 are rotatable in the bearings 72, 72 in the opposite side walls of the housing; and at the housing side wall 40 to each shaft is keyed a gear 74, all the gears 74 (twelve in number) being arranged in intermeshing relation, as best shown in Fig. 1 of the drawings. One of these gears 74 is used as the motored gear; and to this end the shaft thereof carries a pulley 76 which is driven by means of the belting 78 from a variable speed motor 80 (see particularly Fig. 1). Operation of the motor rotates the pulley 76 in the direction indicated by the arrow 82 (Fig. 1), this resulting in rotating the toothed members or elements t, t in the directions indicated by the arrows in Fig. 2, alternate sets of the toothed members being rotated in the same direction and adjacent sets being rotated in opposite directions.

The relation between the teeth T, T of the drum rotor 52 and teeth t, t of the toothed members 30 during the rotation of both the rotor and the toothed members is indicated for the No. 8 set of toothed members in Fig. 4 of the drawings, a row of teeth B is shown at the point of passing the teeth of the No. 8 set; and in the commercial construction of the machine illustrated in the drawings the clearance between the faces of the teeth is approximately 3/16". When the staggered tooth row A passes the No. 8 set of the toothed members 30 the row of teeth are positioned on the opposite side of the toothed elements or star wheels 30, 30, also at approximately the same face clearance. These same conditions exist with reference to the movement and clearances between the rotor teeth and the star wheels of the other sets of toothed members, which latter are best shown in the development view of Fig. 5 of the drawings.

Referring now to Fig. 5 of the drawings, the twelve sets of toothed members 30, 30 which are depicted in Fig. 2 of the drawings are shown as they may be assembled with a given machine makeup, this assembly and arrangement being, however, varied with the different position that the deveining machine may take in a plant setup. As will be seen from Fig. 5, the star wheels for the successive sets of toothed members are varied in number and in spacing, the spacer sleeves 70, 70 being made of different lengths for this purpose, four such different lengths being employed for the spacing sleeves depicted in Fig. 5.

It is found that the machine of the present invention may be operated at lower rotational speeds for the toothed rotor (compared to the rotor speeds of prior machine types); and with the machine of the present invention the speed of the toothed rotor 26 is made variable through a range of 145 R. P. M. to 702 R. P. M. (different speeds being used depending upon the position of the machine in the deveining plant setup) and the speed of the toothed members 30, 30 may be made to vary from 39 R. P. M. to 156 R. P. M. The surface speed of the teeth T, T of the rotor and the teeth t, t of the star wheels 30 is so arranged that at any adjustment of rotor speed or star wheel speed the surface speeds are different, the star wheel speed always being the slower.

In the operation of this machine the tobacco leaves fall on the toothed rotor 26, being dropped thereon through the charging opening 22, by gravity and the tobacco leaves are carried or conveyed by the rotor teeth T, T through the star wheels 30, 30 until cleared from the rotor by the action of the rotating star wheels or toothed members 30, 30. The lateral clearance between the rotor teeth T, T and the star wheel teeth t, t is such that a tobacco leaf cannot pass (except edgewise) without coming into contact with both a tooth on the rotor and a side of a star wheel. Due to the relative surface speeds of the rotor teeth T, T and the star wheel teeth t, t a smooth combing action on the leaf takes place. The stems being tough and fibrous, and the clearance between the star wheels and the rotor teeth being larger than the diameter of the stems, the stems are permitted to pass through this shearing action without being broken or cut. The laminae being thin and easily torn, and of larger size, are cut by the star wheels 30, 30 and are torn from the stems by the combing action. As the laminae are torn from the stems they now either fall out or are carried out by the intermeshing rotating star wheels 30, 30 past the star wheel shafts 68, 68 to the discharge area of the machine, dropping through the chute 24. The stems having lost the laminae now follow the course of the laminae.

The ability to select differing speeds (within the range) of the star wheel shafts is desirable due to (a) the treatment of different classes and types of tobacco; (b) the degree of moisture contained in the tobacco; and (c) the position of the deveining machine in the complete process line or plant setup. It is customary to employ as many as five deveining machines or threshing units in a plant set-up for a complete removal of laminae from the stem, with pneumatic separation of clean laminae after each unit machine before passing the unclean stems to the next unit machine. The alternating succession of rotation of the star wheel shafts tends to remove the laminae to the discharge area; and the greater the speed the more laminae are removed at the start of the travel of the machine, and the slower the speed the further the tobacco travels by the series of star wheel shafts.

While I have depicted the machine of the present invention in a preferred form to exemplify the underlying principles thereof, it will be apparent that many changes may be made in its construction and in the arrangement of the parts without departing from the principles of the invention defined in the following claims.

I claim:

1. A tobacco leaf deveining machine comprising a casing having a charging opening and a discharging opening, a toothed rotor in the casing arranged to receive tobacco leaves from said charging opening and to convey the same to be deveined, a plurality of movable toothed members in said casing spaced about the periphery of the toothed rotor and disposed in basket formation between the rotor and said discharging opening, the teeth of the rotor and the teeth of said members being spaced to intermesh to act upon the said conveyed leaves to devein the same, the said movable toothed members defining the only cage of the machine through which the deveined leaves are discharged into said discharging opening, and mechanism for cooperatively revolving the rotor and moving said members whereby the teeth of said rotor and the teeth of said members are both moved, with the one moved relatively to the other.

2. A tobacco leaf deveining machine comprising a casing having a charging opening and a discharging opening, a toothed rotor in the casing arranged to receive tobacco leaves from said charging opening and to convey the same to be deveined, a plurality of rotatable toothed members in said casing spaced about the periphery of the toothed rotor and disposed in basket formation between the rotor and said discharging opening, the teeth of the rotor and the teeth of said members being spaced to intermesh to act upon the said conveyed leaves to devein the same, the said rotatable toothed members defining the only cage of the machine through which the deveined leaves are discharged into said discharging opening, and mechanism for cooperatively revolving the rotor and rotating said members.

3. The tobacco leaf deveining machine of claim 2 in which the toothed members comprise star wheels.

4. A tobacco leaf deveining machine comprising a casing having a charging opening and a discharging opening, a toothed rotor in the casing arranged to receive tobacco leaves from said charging opening and to convey the same to be deveined, a plurality of rotatable toothed members in said casing spaced about the periphery of the toothed rotor and disposed in basket formation between the rotor and said discharging opening, the teeth of the rotor and the teeth of said members being spaced to intermesh to act upon the said conveyed leaves to devein the same, the said rotatable toothed members defining the only cage of the machine through which the deveined leaves are discharged into said discharging opening, and mechanism for cooperatively revolving the rotor and rotating said members at speeds whereby the teeth of said rotor and the teeth of said members are both rotated with the teeth of the rotor moving at a surface speed greater than the surface speed movement of the teeth of said members.

5. A tobacco leaf deveining machine comprising a casing having a charging opening and a discharging opening, a rotor in said casing having teeth axially and circumferentially disposed thereon, said rotor being arranged to receive tobacco leaves from said charging opening and to convey the same to be deveined, a plurality of axially and circumferentially spaced rotatable toothed members in said casing arranged about the periphery of the rotor and disposed in basket formation between the rotor and said discharging opening, the teeth of the rotor and the teeth of said members being spaced to intermesh to act upon the said conveyed leaves to devein the same, the said rotatable toothed members defining the only cage of the machine through which the deveined leaves are discharged into said discharging opening, and mechanism for cooperatively revolving the rotor and rotating said toothed members.

6. The deveining machine of claim 5 in which the rotatable toothed members comprise circumferentially arranged sets, each set consisting of axially spaced toothed members fixed to a rotatable shaft.

7. The deveining machine of claim 6 in which the mechanism for cooperatively revolving the rotor and rotating said members includes means for rotating alternate sets of the toothed members in the same direction and adjacent sets in the opposite direction.

8. The deveining machine of claim 5 in which the mechanism for cooperatively revolving the rotor and rotating said members includes means for moving the rotor teeth at a surface speed greater than the surface speed movement of the teeth of said members.

9. A tobacco leaf deveining machine comprising a drum rotor having axial rows of teeth circumferentially disposed thereon, a shaft for the rotor, said rotor being arranged to receive and convey a charge of tobacco leaves to be deveined, a plurality of sets of axially spaced toothed members, said sets being circumferentially arranged about the periphery of the rotor, a shaft for each set of toothed members provided with a driving pinion, the pinions of adjacent shafts being in mesh, the teeth of the rotor and the teeth of said members being spaced to intermesh to act upon the said conveyed leaves to devein the same, the sets of toothed members being arranged about the periphery of the drum rotor to form an only discharge cage for the products of the deveined leaves and mechanism for revolving the rotor shaft and rotating one of said member shafts, whereby the teeth of said rotor and the teeth of said members are both rotated, with the one relatively to the other.

10. A tobacco leaf deveining machine comprising a casing having a charging opening and a discharging opening, a toothed rotor in the casing arranged to receive tobacco leaves from said charging opening and to convey the same to be deveined, a plurality of rotatable and intermeshing toothed members in said casing spaced about the periphery of the toothed rotor and disposed in basket formation between the rotor and said discharging opening, the teeth of the rotor and the teeth of said members being spaced to intermesh to act upon the said conveyed leaves to devein the same, the said rotatable toothed members defining the cage of the machine through which the deveined leaves are discharged into said discharging opening, and mechanism for cooperatively revolving the rotor and rotating said members.

11. A tobacco leaf deveining machine comprising a casing having a charging opening and a discharging opening, a rotor in said casing having teeth axially and circumferentially disposed thereon, said rotor being arranged to receive tobacco leaves from said charging opening and to convey the same to be deveined, a plurality of sets of rotatable toothed members, each set consisting of axially spaced toothed members, in said casing arranged circumferentially about the periphery of the drum rotor and disposed in basket formation between the rotor and said discharging opening, the teeth of the rotor and the teeth of said members being spaced to intermesh and the toothed members of said sets also intermeshing to act upon the said conveyed leaves to devein the same, the said rotatable sets of toothed members defining the cage of the machine through which the deveined leaves are discharged into said discharging opening, and mechanism for cooperatively revolving the rotor and rotating said members whereby the teeth of said rotor and the teeth of said members are both rotated, with the one rotated relatively to the other.

12. The deveining machine of claim 10 in which the toothed members comprise star wheels.

13. The deveining machine of claim 10 in which the mechanism for cooperatively revolving the rotor and rotating said members includes means for moving the rotor teeth at a surface speed greater than the surface speed movement of the teeth of said members.

14. The deveining machine of claim 11 in which the mechanism for cooperatively revolving the rotor and rotating said members includes means for rotating alternate sets of the toothed members in the same direction and adjacent sets in the opposite direction.

References Cited in the file of this patent

UNITED STATES PATENTS

| 288,895 | Wallace | Nov. 20, 1883 |
| 656,481 | Scholtz | Aug. 21, 1900 |
| 1,182,835 | Campen | May 9, 1916 |
| 2,012,250 | Rundell | Aug. 20, 1935 |
| 2,152,791 | Dahlstrom | Apr. 4, 1939 |

FOREIGN PATENTS

| 623,070 | Great Britain | May 11, 1949 |
| 865,852 | Germany | Feb. 5, 1953 |